(12) United States Patent
Arnstein

(10) Patent No.: US 11,316,418 B2
(45) Date of Patent: Apr. 26, 2022

(54) ADAPTIVE INSTALLATION ROTARY ENCODER

(71) Applicant: LEINE & LINDE AB, Strängnäs (SE)

(72) Inventor: Richard Arnstein, Strängnäs (SE)

(73) Assignee: LEINE & LINDE AB, Strängnäs (SE)

(*) Notice: Subject to any disclaimer, the term of this patent is extended or adjusted under 35 U.S.C. 154(b) by 103 days.

(21) Appl. No.: 16/825,255

(22) Filed: Mar. 20, 2020

(65) Prior Publication Data
US 2020/0304003 A1    Sep. 24, 2020

(30) Foreign Application Priority Data
Mar. 20, 2019 (EP) ..................... 19164130

(51) Int. Cl.
| | |
|---|---|
| H02K 24/00 | (2006.01) |
| G01D 5/14 | (2006.01) |
| G01D 5/16 | (2006.01) |
| H02K 11/21 | (2016.01) |
| G01D 5/24 | (2006.01) |
| H02K 7/00 | (2006.01) |

(52) U.S. Cl.
CPC ............ *H02K 24/00* (2013.01); *G01D 5/14* (2013.01); *G01D 5/16* (2013.01); *G01D 5/24* (2013.01); *H02K 11/21* (2016.01); *H02K 7/003* (2013.01)

(58) Field of Classification Search
CPC ........ H02K 24/00; H02K 11/21; H02K 7/003; G01D 5/16; G01D 5/14; G01D 5/24; G01D 5/24442; G01D 5/24438; H03M 1/645; H03M 1/00; H03M 1/22; H03M 1/26; H03M 1/301; H03M 1/305; H03M 1/485; H03M 1/0617; H03M 1/1066; H03M 1/143; H03M 1/161; H03M 1/30; H03M 1/303; H03M 1/308; H03M 1/50; H03M 1/64
See application file for complete search history.

(56) References Cited

U.S. PATENT DOCUMENTS

| | | | |
|---|---|---|---|
| 4,386,270 A | 5/1983 | Ezekiel | |
| 8,134,262 B2 | 3/2012 | Siraky | |
| 8,536,480 B2 | 9/2013 | Miwa et al. | |
| 2008/0054765 A1* | 3/2008 | Siraky | ............... G01D 5/34707 310/68 B |

(Continued)

FOREIGN PATENT DOCUMENTS

| | | |
|---|---|---|
| EP | 2 136 456 A1 | 12/2009 |
| EP | 2 338 630 A1 | 6/2011 |

(Continued)

*Primary Examiner* — Son T Le
(74) *Attorney, Agent, or Firm* — Carter, DeLuca & Farrell LLP

(57) ABSTRACT

A rotary encoder includes a rotor and a stator. The rotor and the stator are arranged in the rotary encoder such that, when the rotary encoder is arranged on a machine that includes a shaft having a rotation axis, a rotation of the rotor in relation to the stator about the rotation axis of the shaft is allowed, a relative movement between the rotor and the stator along the rotation axis of the shaft is restricted to a predetermined distance, and a movement of the rotor in relation to the shaft along the rotation axis of the shaft is allowed. Additionally, movement of the stator in relation to the machine along the rotation axis of the shaft may be allowed.

12 Claims, 6 Drawing Sheets

(56) References Cited

U.S. PATENT DOCUMENTS

2009/0250552 A1* 10/2009 Kearns .................. B64C 25/24
                                                      244/102 A
2010/0060112 A1    3/2010 Nagamatsu et al.
2018/0159405 A1    6/2018 Strasser

FOREIGN PATENT DOCUMENTS

EP     3 330 676 A1    6/2018
EP     3 392 538 A1    10/2018

* cited by examiner

ADAPTIVE INSTALLATION ROTARY ENCODER

CROSS-REFERENCE TO RELATED APPLICATIONS

The present application claims priority to Application No. 19164130.7, filed in the European Patent Office on Mar. 20, 2019, which is expressly incorporated herein in its entirety by reference thereto.

FIELD OF THE INVENTION

The present invention relates to rotary encoders.

BACKGROUND INFORMATION

Rotary encoders are used in industry for monitoring of position and speed and are typically mounted on a rotary part such as shaft of a motor or a gearbox. Mechanical stress, for example due to vibrations, is one reason for rotary encoder malfunction, which thereby generates unplanned stops during operational use.

The size of rotary encoders is a limiting factor in many applications and hence, for such applications, end users typically strive to have as small dimensions of the rotary encoder as possible. To this end, so called bearing free encoders are used within the industry for position and speed monitoring. Small installation dimensions and high environmental specifications are advantageous properties of bearing free encoders. Furthermore, failures in relation to bearings are common failures within regular encoders which is a further reason to why bearing free encoders are beneficial.

A problem may arise in conventional bearing free encoders due to movement along a rotation axis of a shaft on which the encoder is arranged. Such movements along the rotation axis of the shaft may, for example, result from elongation of the shaft due to heat and may impact a relative position between a rotor and a stator in a bearing free encoder to such an extent that the accuracy of signals of the bearing free encoder is reduced.

SUMMARY

Example embodiments of the present invention provide a rotary encoder, which mitigates, alleviates, or eliminates one or more of the above-identified deficiencies.

According to an example embodiment of the present invention, a rotary encoder includes a rotor and a stator. The rotor and the stator are arranged in the rotary encoder such that, when the rotary encoder is arranged on a machine that includes a shaft having a rotation axis, rotation of the rotor in relation to the stator about the rotation axis of the shaft is allowed, a relative movement between the rotor and the stator along the rotation axis of the shaft is restricted to a predetermined distance, and a movement of the rotor in relation to the shaft along the rotation axis of the shaft is allowed.

By arranging the rotor in the rotary encoder such that it is allowed to move in relation to the shaft along a rotation axis of the shaft, a movement of the shaft along the rotation axis will not necessarily result in the same movement of the rotor as it would for an arrangement where the rotor is fixed on the shaft and not allowed to move in relation to the shaft along the rotation axis. Furthermore, by arranging the rotor and the stator in the rotary encoder such that the relative movement between the rotor and the stator along the rotation axis of the shaft is restricted to a predetermined distance, the rotor can be allowed a freedom of movement along the rotation axis of the shaft without the relative distance between the stator and the rotor along the rotation axis of the shaft varying more than what is allowed for accurate operation of the rotary encoder. Restriction of the distance of relative movement between the rotor and the stator within the limits for what is allowed for accurate operation is thus achieved also for cases where a movement of the shaft along the rotation axis is longer than the limits for what is allowed for accurate operation.

The predetermined distance is generally selected such that the variation of the relative distance between the stator and the rotor along the rotation axis of the shaft is less or equal to a largest variation that is allowed for accurate operation of the rotary encoder in intended applications. The variation allowed may, for example, depend on whether the rotary encoder uses radial sensing or axial sensing and on the technology used for sensing/detection, such as capacitive, optical, inductive, and magnetic detection.

In rotary encoders, sensing by a stator of rotation of a rotor is made in an axial direction, i.e., along a direction of a rotary axis of a shaft on which the rotor is arranged. This is different from radially sensing rotary encoders, where sensing by a stator of rotation of a rotor is made in a radial direction of a rotary axis of a shaft on which the rotor is arranged.

In certain configurations, the rotary encoder includes a rotor carrying device and a stator carrying device. The rotor is fixed to the rotor carrying device and the stator is fixed to the stator carrying device. The rotor carrying device and the stator carrying device are further arranged such that, when the rotor carrying device is arranged on the shaft and the stator carrying device is arranged on the machine that includes the shaft, a rotation of the rotor carrying device in relation to the stator carrying device about the rotation axis of the shaft is allowed, and a relative movement between the rotor carrying device and the stator carrying device along the rotation axis of the shaft is restricted to the predetermined distance. The rotor carrying device is further arranged such that, when arranged on the shaft, a movement of the rotor carrying device in relation to the shaft along the rotation axis of the shaft is allowed.

The stator carrying device may include a first surface and a second surface, and the rotor carrying device may include a third surface and a fourth surface, wherein, when the rotor carrying device is arranged on the shaft and the stator carrying device is arranged on the machine that includes the shaft, the first surface faces the third surface in a direction along the rotation axis of the shaft and the second surface faces the fourth surface in a direction along the rotation axis of the shaft. The absolute value of the difference between a distance in a direction along the rotation axis of the shaft from the first surface to the second surface and a distance in a direction along the rotation axis of the shaft from the third surface to the fourth surface is the predetermined distance.

By arranging the stator carrying device and the rotor carrying device such that there is a difference between the distances between the first surface and the second surface and the distance between the third surface and the fourth surface, movement of the rotor carrying device along the rotation axis of the shaft is limited to this difference in distance. More specifically, the movement along the rotation axis of the rotor carrying device in relation to the stator carrying device is limited in one direction along the rotation axis by the first surface of the stator carrying device coming in contact with the third surface of the rotor carrying device.

The movement along the rotation axis of the rotor carrying device in relation to the stator carrying device is limited in the other direction along the rotation axis by the second surface of the stator carrying device coming in contact with the fourth surface of the rotor carrying device.

The distance in a direction along the rotation axis of the shaft from the first surface to the second surface may be greater than a distance in a direction along the rotation axis of the shaft from the third surface to the fourth surface.

The first surface, the second surface, the third surface, and the fourth surface may be arranged such that, when the rotor carrying device is arranged on the shaft and the stator carrying device is arranged on the machine that includes the shaft, the first surface, the second surface, the third surface, and the fourth surface are arranged adjacent to the shaft.

The closer the first surface and the second surface are to the rotation axis, the smaller the relative speed will be between the first surface and the third surface at a specific number of rotations per time unit. This is beneficial since the first surface and the third surface may come into contact when the shaft moves along the rotation axis, for example, due to heat expansion. Reducing the relative speed due to rotation between the first surface and the third surface will reduce the torsion forces resulting from the first surface and the third surface coming into contact when the rotor carrying device is rotating. The same applies for the second surface and fourth surface, which may come into contact when the shaft moves along the rotation axis in the opposite direction.

The rotor carrying device may include a first engagement device for engagement with a corresponding second engagement device of the shaft such that, when the rotor carrying device is arranged on the shaft, a rotation of the rotor carrying device in relation to the shaft about the rotation axis of the shaft is prevented, and a movement of the rotor carrying device in relation to the shaft along the rotation axis of the shaft is allowed.

The first engagement device may include spring loaded protrusions arranged to engage with the corresponding second engagement device in the form of recesses of the shaft extending along the outer surface of the shaft in the direction of the rotation axis of the shaft.

According to an example embodiment of the present invention, a rotary encoder includes a rotor and a stator. The rotor and the stator are arranged in the rotary encoder such that, when the rotary encoder is arranged in engagement with a machine that includes a shaft having a rotation axis, a rotation of the rotor in relation to the stator about the rotation axis of the shaft is allowed, a relative movement between the rotor and the stator along the rotation axis of the shaft is restricted to be less than a predetermined distance, and a movement of the stator in relation to the machine along the rotation axis of the shaft is allowed.

By arranging the stator in the rotary encoder such that it is allowed to move in relation to the machine along the rotation axis of the shaft, any movement of the shaft along the rotation axis in relation to the machine, will not necessarily result in the same amount of relative movement between the shaft and the stator. Furthermore, by arranging the rotor and the stator in the rotary encoder such that the relative movement between the rotor and the stator along the rotation axis of the shaft is restricted to a predetermined distance, the stator can be allowed a freedom of movement in relation to the machine along the rotation axis of the shaft without the relative distance between the stator and the rotor along the rotation axis of the shaft varying more than what is allowed for accurate operation of the rotary encoder. Restriction of the distance of relative movement between the rotor and the stator within the limits for what is allowed for accurate operation is achieved also for cases where a movement of the shaft along the rotation axis is greater than the limits for what is allowed for accurate operation.

The predetermined distance is generally selected such that the variation of the relative distance between the stator and the rotor along the rotation axis of the shaft is less or equal to a largest variation that is allowed for accurate operation of the rotary encoder in intended applications. The variation allowed may, for example, depend on whether the rotary encoder uses radial sensing or axial sensing and on the technology used for sensing/detection, such as capacitive, optical, inductive and magnetic detection.

The rotary encoder may include a rotor carrying device and a stator carrying device. The rotor is fixed to the rotor carrying device and the stator is fixed to the stator carrying device. The rotor carrying device and the stator carrying device are further arranged such that, when the rotor carrying device is arranged on a shaft having a rotation axis and the stator carrying device is arranged on a machine that includes the shaft, a rotation of the rotor carrying device in relation to the stator carrying device about the rotation axis of the shaft is allowed, and a relative movement between the stator carrying device and the rotor carrying device along the rotation axis of the shaft is allowed up to the predetermined distance. The stator carrying device is further arranged such that, when arranged on the machine that includes the shaft, movement of the stator carrying device along the rotation axis of the shaft is allowed.

The stator carrying device may include a first surface and a second surface, and the rotor carrying device may include a third surface and a fourth surface. When the rotor carrying device is arranged on the shaft and the stator carrying device is arranged on the machine that includes the shaft, the first surface faces the third surface in a direction along the rotation axis of the shaft, and the second surface faces the fourth surface in a direction along the rotation axis of the shaft. Furthermore, the absolute value of the difference between a distance in a direction along the rotation axis of the shaft from the first surface to the second surface and a distance in a direction along the rotation axis of the shaft from the third surface to the fourth surface is the predetermined distance.

By arranging the stator carrying device and the rotor carrying device such that there is a difference between the distances between the first surface and the second surface and the distance between the third surface and the fourth surface, the movement of the rotor carrying device along the rotation axis of the shaft is limited to this difference in distance. More specifically, the movement along the rotation axis of the rotor carrying device in relation to the stator carrying device is limited in one direction along the rotation axis by the first surface of the stator carrying device coming in contact with the third surface of the rotor carrying device. The movement along the rotation axis of the rotor carrying device in relation to the stator carrying device is limited in the other direction along the rotation axis by the second surface of the stator carrying device coming in contact with the fourth surface of the rotor carrying device.

The distance in a direction along the rotation axis of the shaft from the first surface to the second surface may be greater than a distance in a direction along the rotation axis of the shaft from the third surface to the fourth surface.

The stator carrying device may include a first engagement device for engagement with a corresponding second engagement device of the machine. The first engagement device and second engagement device are arranged such that a rotation of the stator carrying device in relation to the machine about the rotation axis of the shaft is prevented, and a movement of the stator carrying device in relation to the machine along the rotation axis of the shaft is allowed when the stator carrying device is arranged on the machine.

The first engagement device may include through holes arranged to engage with the corresponding second engagement device in the form of guiding shafts arranged on the machine and extending in the direction of the rotation axis of the shaft.

Further features and aspects of example embodiments of the present invention are described in greater detail below with reference to the appended Figures, in which like reference characters refer to corresponding components throughout the several views. The drawings are not necessarily to scale, emphasis instead being placed upon illustrating the example embodiments.

BRIEF DESCRIPTION OF THE DRAWINGS

FIG. 1b is an exploded perspective cross-sectional view of the rotary encoder illustrated in FIG. 1a.

FIG. 4b is an exploded perspective cross-sectional view of the rotary encoder illustrated in FIG. 4a.

DETAILED DESCRIPTION

Figure 1A:
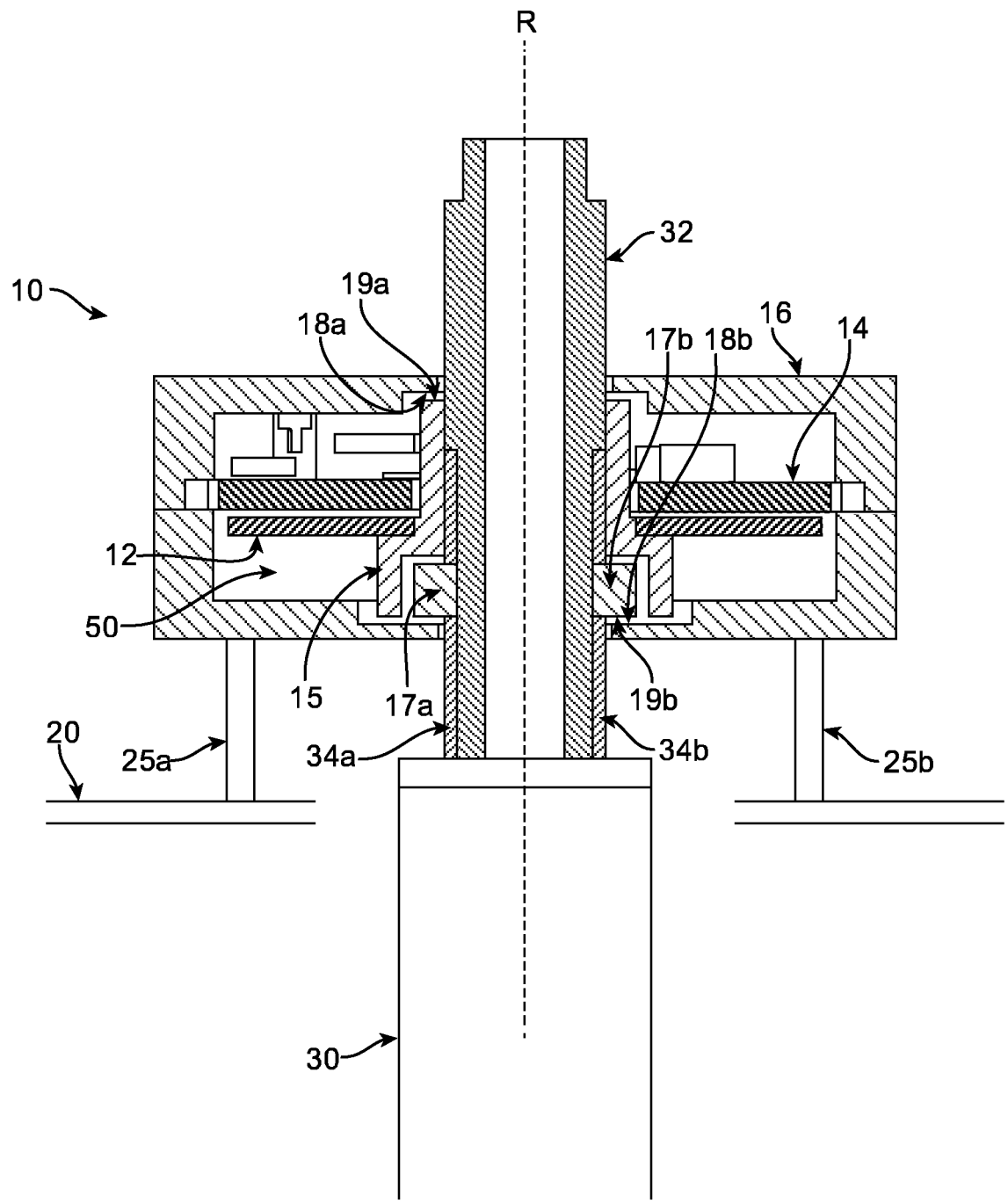
FIG. 1a is a cross-sectional view of a rotary encoder according to an example embodiment of the present invention as arranged on a machine including a shaft.

Certain aspects of example embodiments of the present invention are described more fully hereinafter with reference to the accompanying Figures. The rotary encoder disclosed herein may be realized in many different forms and should not be construed as being limited to the aspects set forth herein. Like numbers in the drawings refer to like components throughout.

The terminology used herein is for the purpose of describing particular aspects hereof and is not intended to be limiting. As used herein, the singular forms "a", "an," and "the" are intended to include the plural forms as well, unless the context clearly indicates otherwise.

FIG. 1a is a cross-sectional view of a rotary encoder 10 according to an example embodiment of the present invention as arranged on a machine 20 including a machine shaft 30. The encoder includes a rotor 12 and a stator 14. The rotor 12 is arranged on a rotor carrying device in the form of a bushing 15, and the stator 14 is arranged on a stator carrying device in the form of a housing 16. The rotation of the rotor 12 with respect to the stator may be detected using any technology capable of detecting such changes. Examples of such technologies include, for example, capacitive, optical, inductive, and magnetic detection. The rotary encoder may be configured as an incremental and/or an absolute rotary encoder. The terms rotor and stator may refer to single components as well as aggregates serving a common function of rotor or stator.

It should be noted, that even if the rotor 12 is shown arranged on the bushing 15 and the stator 14 is shown arranged on the housing 16 in FIG. 1a, alternative arrangements are possible also in the configuration illustrated in FIG. 1a, where the rotor 12 is arranged via one or more further devices to the bushing 15 or the stator 14 is arranged via one or more further device to the housing 16, such that the rotor 12 is fixed in rotational and axial direction to the bushing 15 and the stator 14 is fixed in rotation and axial direction to the housing 16.

The bushing 15 is arranged inside the housing 16. Furthermore, the bushing 15 is arranged on a stub shaft 32 which in turn is arranged on the machine shaft 30 of the machine 20. The stub shaft 32 is arranged on the machine shaft 30 by suitable fasteners, such that they have a common rotation axis R and such that relative movement along the rotation axis R and relative rotation around the rotation axis between the stub shaft 32 and machine shaft 30 is prevented. The stub shaft 32 is generally used to provide a shaft suitably adapted for arranging the bushing 15 on the stub shaft 32, e.g., to provide suitable dimensions and engagement. In alternative, for a situation where the machine shaft 30 of the machine 20 is already suitably adapted for arranging the bushing 15, the stub shaft 32 would not be required and the rotary encoder 10 would be arranged directly on the machine shaft 30 of the machine 20.

The housing 16 is arranged on the machine 20 by fastening devices 25a and 25b such that rotation of the housing 16 in relation to the machine around the rotation axis R is prevented.

The bushing 15 includes first engagement devices 17a and 17b in the form of spring loaded protrusions. The stub shaft 32 includes corresponding engagement devices 34a and 34b in the form of recesses extending along the outer surface of the stub shaft 32 in a direction of the rotation axis R. The bushing 15 is arranged on the stub shaft 32 such that the first engagement devices 17a and 17b engage with the second engagement devices 34a and 34b, respectively, such that a movement of the bushing 15 in relation to the stub shaft 32 along the rotation axis R is allowed whereas rotation of the bushing 15 in relation to the stub shaft 32 around the rotation axis R is prevented. For example, the protrusions may be spherical at least in the portion arranged to engage with the recesses and the recesses may have a v-shaped cross section along the rotation axis R.

The housing 16 has a first surface 18a perpendicular to the rotation axis R and a second surface 18b perpendicular to the rotation axis R. The bushing 15 has a third surface 19a perpendicular to the rotation axis R and a fourth surface 19b perpendicular to the rotation axis R. The first surface 18a of the housing 16 faces the third surface 19a of the bushing 15, and second surface 18b of the housing 16 faces the fourth surface 19b of the bushing 15. Furthermore, the housing 16 and the bushing 15 are so arranged that the distance from the first surface 18a to the second surface 18b is greater than the distance from the third surface 19a to the fourth surface 19b. Hence, the bushing 15 can move along the rotation axis R from a first position in relation to the housing 16 where the first surface 18a and the third surface 19a are in contact to a second position in relation to the housing 16 where the second surface 18b is in contact with the fourth surface 19b. The difference between the distance from the first surface 18a to the second surface 18b and the distance from the third surface 19a to the fourth surface 19b, i.e., from the first position to the second position, is selected to a predetermined distance. This will, in turn, restrict the relative movement of the rotor 12 arranged on the bushing 15 and the stator 14 arranged on the housing 16 within the predetermined distance. The predetermined distance is selected to be less or equal to a maximum variation of relative distance between the rotor 12 and the stator 14 allowed to produce signals of an accuracy required for an intended application of the rotary encoder 10.

For example, the rotor 12 may be arranged on the bushing 15, the stator 14 may be arranged on the housing 16, and the bushing 15 may be arranged in the housing such that when the bushing 15 is in the first position, the distance between the rotor 12 and the stator 14 is a calibrated distance minus half of the predetermined distance, and when the bushing 15 is in the second position, the distance between the rotor 12 and the stator 14 is the calibrated distance plus half of the predetermined distance. The calibrated distance is a distance identified as suitable distance for operation which may vary half of the predetermined distance up and down, i.e., allowing variation of the predetermined distance while still producing signals of an accuracy required for an intended application of the rotary encoder 10. The calibrated distance is the distance between the rotor 12 and the stator 14 when the bushing 15 is halfway between the first position and the second position.

Although the first surface 18a, second surface 18b, third surface 19a, and fourth surface 19b are all perpendicular to the rotation axis R in the rotary encoder illustrated in FIG. 1a, it should be noted that the surfaces may also have other individual angles in relation to the rotation axis R and other individual shapes as long as the surfaces interact such that the relative movement between the bushing 15 and the housing 16 when the bushing 15 moves along the rotational axis R from a position where at least a portion of the first surface 18a and a portion of the third surface 19a are in contact to a position where at least a portion of the second surface 18b and a portion of the fourth surface 19b are in contact is restricted to the predetermined distance.

The rotary encoder 10 is arranged such that the bushing 15 is slidably arranged on the stub shaft 32. When the stub shaft 32 moves in axial direction, e.g., due to heat expansion of the machine shaft 30 on which the stub shaft 32 is arranged, the bushing 15 may first move in axially direction in relation to the housing 16 together with the stub shaft 32. However, when the third surface 19a of the bushing 15 comes in contact with the first surface 18a of the housing 16, the bushing 15 is stopped from further axial movement towards the first surface 18a in relation to the housing 16. If the movement of the stub shaft 32 continues in the same direction, the bushing 15 is pushed along the rotation axis in relation to the stub shaft 32 by the contact between the third surface 19a and the first surface 18a and the bushing 15 being slidably arranged on the stub shaft 32. Similarly, the rotary encoder 10 is arranged such that when the fourth surface 19b of the bushing 15 comes in contact with the second surface 18b of the housing 16 after axial movement of the bushing 15, the bushing 15 is stopped from further axial movement towards the first surface 18b in relation to the housing 16. If the movement of the stub shaft 32 continues in the same direction, the bushing 15 is pushed along the rotation axis in relation to the stub shaft 32 by the contact between the fourth surface 19b and the second surface 18b and the bushing 15 being slidably arranged on the stub shaft 32.

The rotor 12 should be arranged in the housing 16 such that rotation of the rotor 12 in relation to the stator 14 about the rotation axis R is allowed. For example, in FIG. 1a, the rotor 12 is arranged in a cavity 50 of the housing 16 such that rotation of the rotor 12 in relation to the stator 14 about the rotation axis R is allowed.

It should be noted that the arrangement illustrated in FIG. 1a is merely exemplary. Other arrangements of the rotary encoder are possible. For example, FIG. a illustrates particular arrangements of a stator and a rotor in relation to a housing, a bushing, and a shaft. Alternative arrangements are possible that obtain the relative movements and rotations of the stator, the rotor, and the shaft. For example, the rotor and the stator may be arranged otherwise than directly on the bushing and the housing, respectively. For example, they may be arranged on other parts which, in turn, are arranged on the bushing and the housing, respectively. Furthermore, the first surface, second surface, third surface, and fourth surface may be otherwise arranged than on the bushing and the housing, respectively. For example, they may be arranged on other parts which, in turn, are arranged on the bushing and the housing, respectively. Generally, the first surface and the second surface should be arranged such that they are fixed in relation to the stator in axial direction and the third surface and the fourth surface should be arranged such that they are fixed in relation to the rotor in axial direction.

For example, alternatives exist to the configuration illustrated in FIG. 1a. For example, a stub shaft may be arranged on a machine shaft such that a relative movement along the rotation axis R between the stub shaft and machine shaft is allowed and where a rotor carrying device is arranged on the stub shaft such that relative movement along the rotation axis R between the rotor carrying device and the stub shaft is prevented.

In the rotary encoder 10 illustrated in FIG. 1a, the rotor 12 and the stator 14 are arranged such that the stator 14 is arranged at an equal radial distance from the rotation axis R as at least a portion of the rotor 12. This differs from a radially sensing rotary encoder where a stator is arranged at a longer or shorter but not equal radial distance from a rotation axis than a rotor.

Figure 1B:
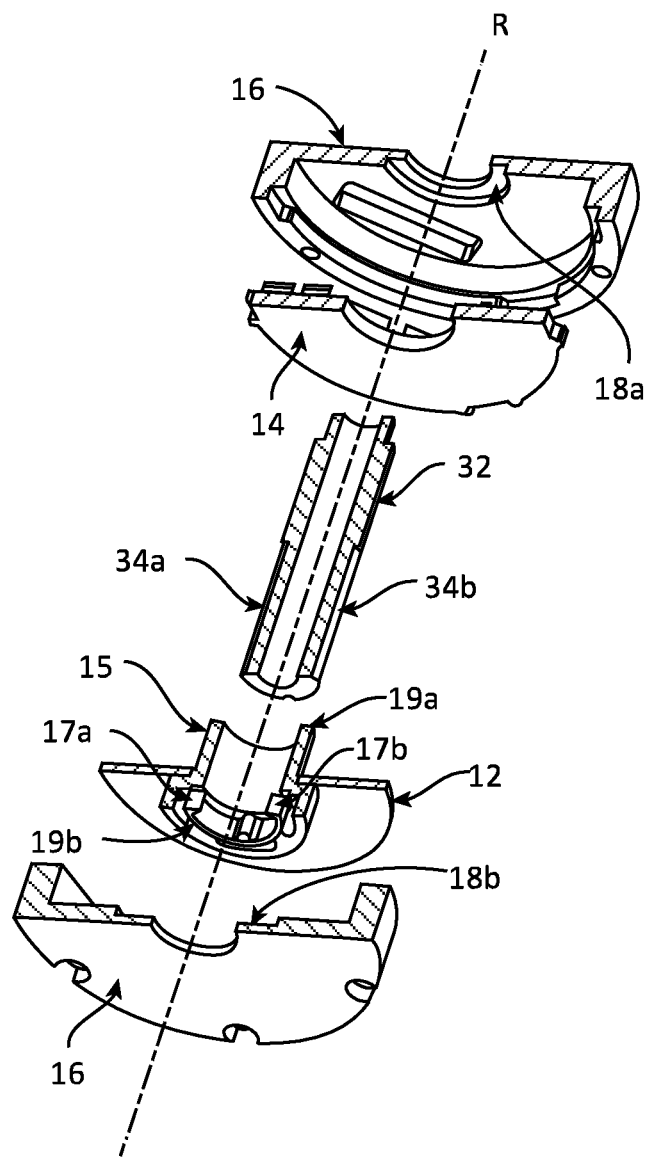

FIG. 1b is an exploded perspective view of the rotary encoder 10. The stator 14 is adapted to be arranged in the upper part of the housing 16. Both the stator 14 and the upper part of the housing 16 have a hole in the center through which the stub shaft 32 may protrude when the rotary encoder 10 is arranged on the machine that includes the shaft on which the stub shaft 32 is arranged. The upper portion of the housing 16 includes the first surface 18a.

The rotor 12 is arranged on the bushing 15, and the bushing 15 has a hole for arranging the bushing 15 on the stub shaft 32. The first engagement devices 17a and 17b in the form of two spring loaded protrusions is arranged so that the spring loaded protrusions protrude into the hole of the bushing 15 such that they engage with the second engagement devices 34a and 34b in the form of corresponding two recesses in the stub shaft 32 when the bushing 15 is arranged on the stub shaft 32. The second engagement devices 34a and 34b in the form of the two recesses extend along the rotation axis R of the stub shaft 32 such that when the bushing 15 is arranged on the stub shaft 32, the bushing 15 is allowed to move in relation to the stub shaft 32 along the rotation axis R of the stub shaft 32 but the bushing 15 is prevented to rotate in relation to the stub shaft 32 around the rotation axis R of the stub shaft 32.

Furthermore, as illustrated in FIG. 1b, the first surface 18a and the second surface 18b of the housing 16 are arranged to in relation to the third surface 19a and the fourth surface 19b of the bushing 15, such that the distance from the first surface 18a to the second surface 18b is greater than the distance from the third surface 19a to the fourth surface 19b. Hence, the bushing 15 can move along the rotation axis R from a first position in relation to the housing 16 where the first surface 18a and the third surface 19a are in contact to a second position in relation to the housing 16 where the second surface 18b is in contact with the fourth surface 19b. The difference between the distance from the first surface 18a to the second surface 18b and the distance from the third surface 19a to the fourth surface 19b, i.e., from the first position to the second position, is selected to a predetermined distance. This will, in turn, restrict the relative movement of the rotor 12 arranged on the bushing 15 and the stator 14 arranged on the housing 16 within the predetermined distance. The predetermined distance is selected to be less or equal to a maximum variation of relative distance between the rotor 12 and the stator 14 allowed to produce signals of an accuracy required for an intended application of the rotary encoder 10.

FIGS. 2a to 2d are cross-sectional views of alternative implementations of a portion the rotary encoder. More specifically, FIGS. 2a to 2d illustrate alternative arrangements of the first surface 18a, 118a, 218a, 318a and the second surface 18b, 118b, 218b, 318b of the housing 16, 116, 216, 316, and the third surface 19a, 119a, 219a, 319a and the fourth surface 19b, 119b, 219b, 319b of the bushing 15, 115, 215, 315, in order to restrict the movement of the rotor arranged on the bushing 15, 115, 215, 315 in relation to the stator arranged on the housing 16, 116, 216, 316 to a predetermined distance. The predetermined distance is selected to be less or equal to the maximum variation of relative distance between the rotor and the stator allowed to produce signals of an accuracy required for an intended application.

It should be noted that the distances between the surfaces are shown in FIGS. 2a to 2d for purpose of illustration and are not necessarily a true reflection of actual scales of a rotary encoder for real life application.

Figure 2D:
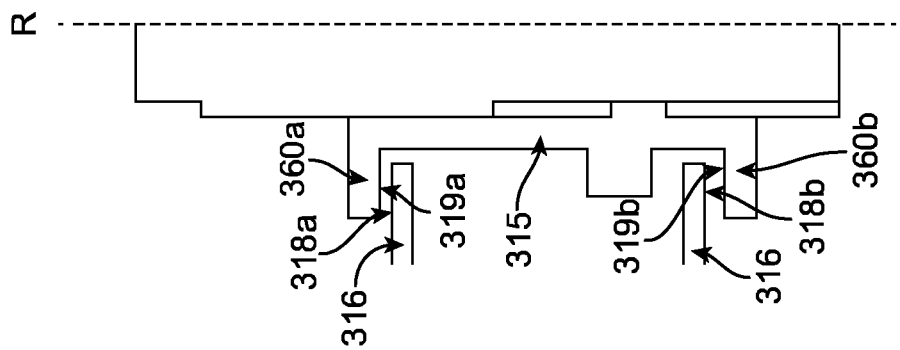
FIGS. 2a to 2d are cross-sectional views of alternative implementations of a portion of the rotary encoder.
Figure 2C:
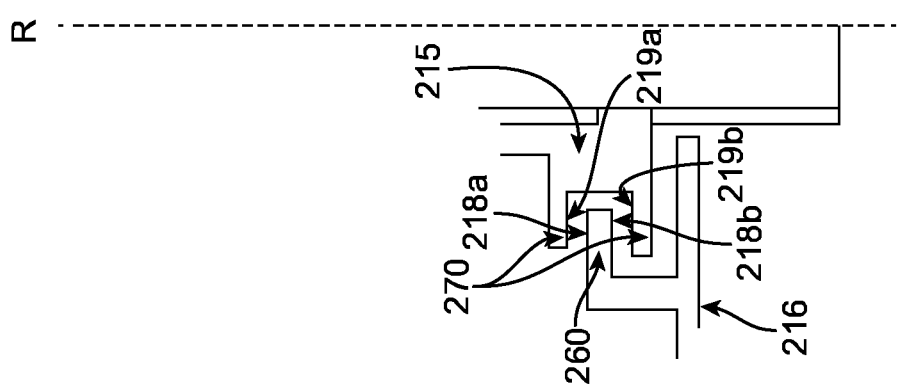
Figure 2B:
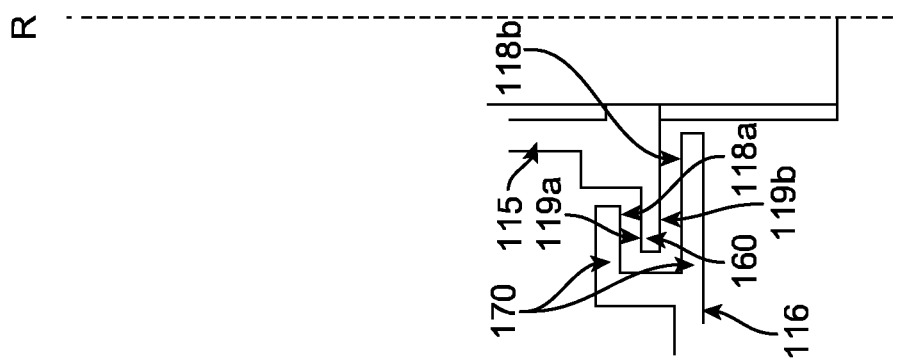
Figure 2A:
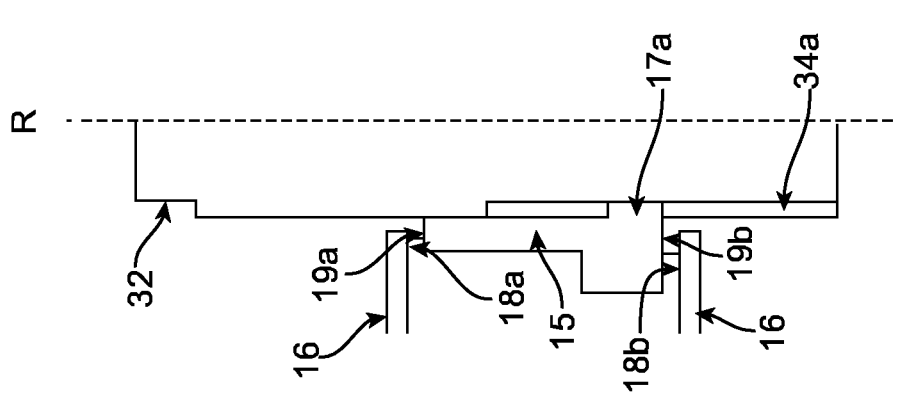

FIG. 2a is a cross-sectional view of a portion of a rotary encoder according to the arrangement of the first surface 18a and the second surface 18b of the housing 16, and the third surface 19a and the fourth surface 19b of the bushing 15 as illustrated in FIGS. 1a and 1b. The third surface 19a and the fourth surface 19b are arranged at the distal ends of the bushing 15 along the rotation axis R. The housing 16 encloses the bushing in the axial direction R and the first surface 18a and the second surface 18b of the housing 16 are arranged to face the third surface 19a and the fourth surface 19b, respectively. Furthermore, the first surface 18a, second surface 18b, third surface 19a, and fourth surface 19b may all be arranged as close to the rotation axis R as possible without interfering with the stub shaft 32 when the bushing 15 is arranged on the stub shaft 32 by the protrusion 17a engaging with the recess 34a. The closer the first surface 18a and the third surface 19a are to the rotation axis, the smaller the relative speed will be between the first surface 18a and the third surface 19a at a specific number of rotations per time unit. This is beneficial since the first surface 18a and the thirds surface may come into contact when the stub shaft 32 moves along the rotation axis R due to heat expansion of the machine shaft in which the stub shaft 32 is arranged. Similarly, the second surface 18b and fourth surface 19b may come into contact when the stub shaft 32 moves along the rotation axis R in the opposite direction.

The bushing 15 and the housing 16 are arranged such that difference between the distance from the first surface 18a to the second surface 18b and the distance from the third surface 19a to the fourth surface 19b is selected to a predetermined distance. This will, in turn, restrict the relative movement of the rotor arranged on the bushing 15 and the stator arranged on the housing 16 within the predetermined distance. The predetermined distance is selected to be less or equal to the maximum variation of relative distance between the rotor and the stator allowed to produce signals of an accuracy required for an intended application.

FIG. 2b is a cross-sectional view of a portion of a rotary encoder according to a first alternative arrangement of surfaces of a housing 116 and a bushing 115 to the arrangement illustrated in FIGS. 1a, 1b, and 2a. The bushing 115 is provided with a protruding portion 160 and the third surface 119a and the fourth surface 119b are arranged at the distal surfaces of the protruding portion 160 along the rotation axis R. The housing 116 is provided with a fork 170 which encloses the protruding portion 160 of the bushing 115 along the rotation axis R and the first surface 118a and the second surface 118b of the housing 116 are arranged on the two inner surfaces along the rotation axis R to face the third surface 119a and the fourth surface 119b, respectively.

The protruding portion 160 of the bushing 115 and the fork 170 of the housing 116 are arranged such that difference between the distance from the first surface 118a to the second surface 118b and the distance from the third surface 119a to the fourth surface 119b is selected to a predetermined distance. This will, in turn, restrict the relative movement of a rotor arranged on the bushing 115 and a stator arranged on the housing 16 within the predetermined distance. The predetermined distance is selected to be less or equal to the maximum variation of relative distance between the rotor and the stator allowed to produce signals of an accuracy required for an intended application.

FIG. 2c is a cross-sectional view of a portion of a rotary encoder according to a second alternative arrangement of surfaces of a housing 216 and a bushing 215 to the arrangement illustrated in FIGS. 1a, 1b, and 2a. In this alternative, the housing 216 is provided with a protruding portion 260 and the first surface 218a and the second surface 218b are arranged at the distal surfaces of the protruding portion 260 along the rotation axis R. The bushing 215 is provided with a fork 270 which encloses the protruding portion 260 of the housing 216 along the rotation axis R and the third surface 219a and the fourth surface 219b of the bushing 15 are arranged on the two inner surfaces along the rotation axis R to face the first surface 218a and the second surface 218b, respectively.

The protruding portion 260 of the housing 216 and the fork 270 of the bushing 215 are arranged such that the difference between the distance from the third surface 219a to the fourth surface 219b and the distance from the first surface 218a to the second surface 218b is selected to a predetermined distance. This will, in turn, restrict the relative movement of a rotor arranged on the bushing 215 and a stator arranged on the housing 16 within the predetermined distance. The predetermined distance is selected to be less or equal to the maximum variation of relative distance between the rotor and the stator allowed to produce signals of an accuracy required for an intended application.

FIG. 2d is a cross-sectional view of a portion of a rotary encoder according to a third alternative arrangement of surfaces of the housing 316 and the bushing 315 to the arrangement illustrated in FIGS. 1a, 1b, and 2a. In this alternative, the bushing 315 is arranged to extend beyond the housing 316 in both distal ends along the rotation axis R. The bushing is provided with a first protruding portion 360a and a second protruding portion 360b. The first surface 318a and the second surface 318*b* of the housing 316 are arranged at the two distal surfaces of housing 316 along the rotation axis R, respectively. The third surface 319*a* and the fourth surface 319*b* of the bushing 315 are arranged on the inner surface of the protruding portion 360*a* along the rotation axis R and the inner surface of the protruding portion 360*b* along the rotation axis R, respectively, to face the first surface 318*a* and the second surface 318*b*, respectively.

The protruding portion 360*a* of the bushing 15, the protruding portion 360*b* of the bushing 315, and the housing 316 are arranged such that difference between the distance from the third surface 319*a* to the fourth surface 319*b* and the distance from the first surface 318*a* to the second surface 318*b* is selected to a predetermined distance. This will, in turn, restrict the relative movement of a rotor arranged on the bushing 315 and a stator arranged on the housing 316 within the predetermined distance. The predetermined distance is selected to be less or equal to the maximum variation of relative distance between the rotor and the stator allowed to produce signals of an accuracy required for an intended application.

Figure 3B:
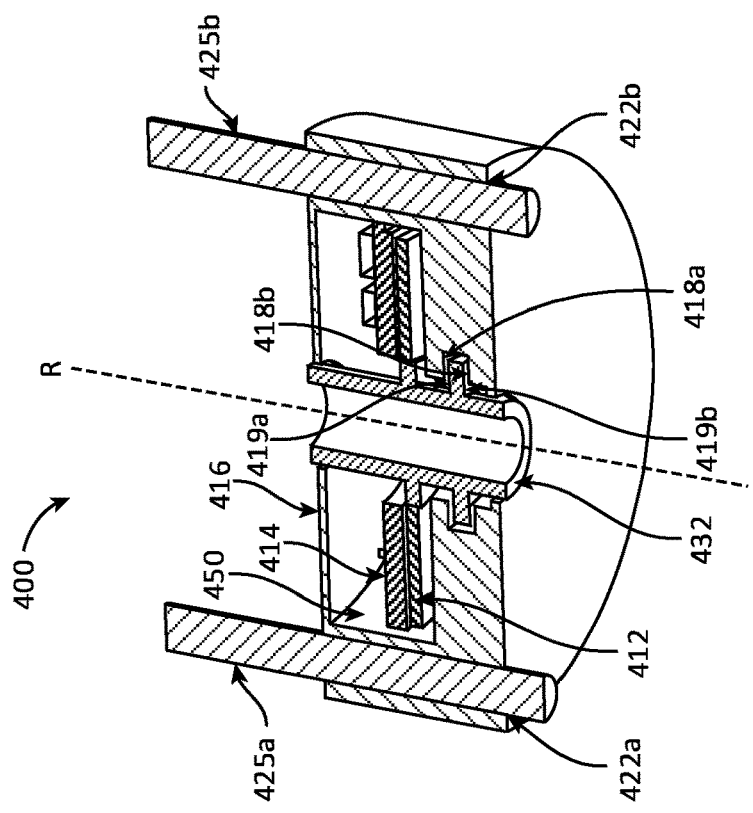
FIG. 3b is a perspective cross-sectional view of the rotary encoder illustrated in FIG. 3.
Figure 3A:
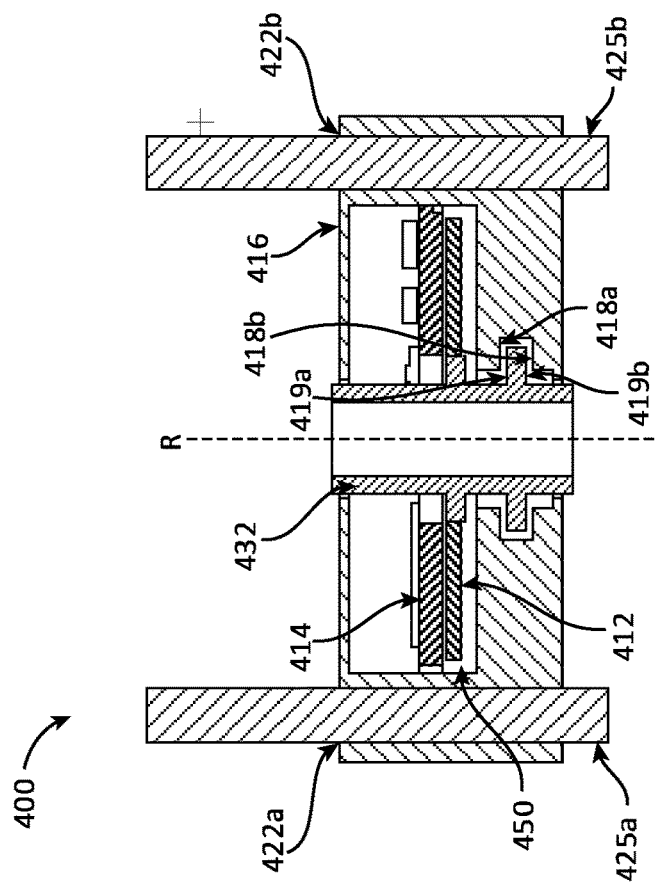
FIG. 3a is a cross-sectional view of a rotary encoder according to an example embodiment of the present invention.

FIG. 3*a* is a cross-sectional view, and FIG. 3*b* is a perspective cross-sectional view of a rotary encoder 400 according to an example embodiment of the present invention for arrangement on a machine that includes a machine shaft. The encoder incudes a rotor 412 and a stator 414. The rotor 412 is arranged on a rotor carrying device 432 and the stator 414 is arranged on a stator carrying device in the form of a housing 416.

It should be noted that even if the rotor 412 is shown arranged on the rotor carrying device 432 and the stator 414 is shown arranged on the housing 416 in FIGS. 3*a* and 3*b*, alternative arrangements are possible, for example, where the rotor 412 is arranged via one or more further devices to the rotor carrying device 432 or the stator 414 is arranged via one or more further devices to the housing 416, such that the rotor 412 is fixed in rotational and axial direction to the rotor carrying device 432 and the stator 414 is fixed in rotational and axial direction to the housing 416.

The rotor carrying device 432 is arranged on the machine shaft by suitable fastening devices, such that the rotor carrying device 432 and the machine shaft have a common rotation axis R and such that relative movement along the rotation axis R and relative rotation around the rotation axis R between the rotor carrying device 432 and machine shaft 430 is prevented.

The housing 416 is arranged on the machine by first engagement device in the form of a first through hole 422*a* and a second through hole 422*b* and second engagement device in the form of a first guiding shaft 425*a* and a second guiding shaft 425*b*. The first through hole 422*a* and the second through hole 422*b* are arranged in the housing 416 of the rotary encoder 400 such that the housing 416 can be arranged on the first guiding shaft 425*a* and a second guiding shaft 425*b* through the first through hole 422*a* and the second through hole 422*b*, respectively. Furthermore, the first guiding shaft 425*a* and a second guiding shaft 425*b* are fastened on the machine by suitable fastening devices. Such an arrangement will prevent rotation of the housing 416 in relation to the machine around the rotation axis R but allow movement of the housing 416 along the rotation axis R in relation to the machine.

The housing 416 has a first surface 418*a* perpendicular to the rotation axis R and a second surface 418*b* perpendicular to the rotation axis R. The rotor carrying device 432 has a third surface 419*a* perpendicular to the rotation axis R and a fourth surface 419*b* perpendicular to the rotation axis R.

The first surface 418*a* of the housing 416 faces the third surface 419*a* of the rotor carrying device 432, and second surface 418*b* of the housing 416 faces the fourth surface 419*b* of the rotor carrying device 432. Furthermore, the housing 416 and the rotor carrying device 432 are so arranged that the distance from the first surface 418*a* to the second surface 418*b* is greater than the distance from the third surface 419*a* to the fourth surface 419*b*. Hence, the housing 416 can move along the rotation axis R from a first position in relation to the rotor carrying device 432 where the first surface 418*a* and the third surface 419*a* are in contact to a second position in relation to the rotor carrying device 432 where the second surface 418*b* is in contact with the fourth surface 419*b*. The difference between the distance from the first surface 418*a* to the second surface 418*b* and the distance from the third surface 419*a* to the fourth surface 419*b*, i.e., from the first position to the second position, is selected to a predetermined distance. This will, in turn, restrict the relative movement of the rotor 412 arranged on the rotor carrying device 432 and the stator 414 arranged on the housing 416 within the predetermined distance. The predetermined distance is selected to be less or equal to a maximum variation of relative distance between the rotor 412 and the stator 414 allowed to produce signals of an accuracy required for an intended application of the rotary encoder 400.

For example, the rotor 412 may be arranged on the rotor carrying device 432, the stator 414 may be arranged on the housing 416, and the rotor carrying device 432 may be arranged in the housing 416 such that when the housing 416 is in the first position, the distance between the rotor 412 and the stator 414 is a calibrated distance minus half of the predetermined distance, and when the housing 416 is in the second position, the distance between the rotor 412 and the stator 414 is the calibrated distance plus half of the predetermined distance. The calibrated distance is a distance identified as suitable distance for operation which may vary half of the predetermined distance up and down, i.e., allowing variation of the predetermined distance while still producing signals of an accuracy required for an intended application of the rotary encoder 400. The calibrated distance is the distance between the rotor 412 and the stator 414 when the rotor carrying device 432 is halfway between the first position and the second position.

Although the first surface 418*a*, second surface 418*b*, third surface 419*a*, and fourth surface 419*b* are all perpendicular to the rotation axis R in the rotary encoder illustrated in FIG. 3*a*, it should be noted that the surfaces may also have other individual angles in relation to the rotation axis R and other individual shapes as long as the surfaces interact such that the relative movement between the rotor carrying device 432 and the housing 416 when the housing 416 moves along the rotational axis R from a first position where at least a portion of the first surface 418*a* and a portion of the third surface 419*a* are in contact to a second position where at least a portion of the second surface 418*b* and a portion of the fourth surface 419*b* are in contact is restricted to the predetermined distance.

The rotary encoder 400 is arranged such that the housing 416 is slidably arranged on the rotor carrying device 432 and on the machine. When the rotor carrying device 432 moves along the rotation axis R, e.g., due to heat expansion of the machine shaft on which the rotor carrying device 432 is arranged, the rotor carrying device 432 may first move in along the rotation axis R in relation to the housing 416. However, when the third surface 419*a* of the rotor carrying device 432 comes in contact with the first surface 418*a* of the housing 416, further relative movement along the rotation axis R between the rotor carrying device 432 and the housing 416 is stopped by the contact between the third surface 419a and the first surface 418a. If the movement of the rotor carrying device 432 continues in the same direction the housing 416 is pushed along the rotation axis by the contact between the third surface 419a and the first surface 418a and the housing 416 being slidably arranged on the machine. Similarly, the rotary encoder 400 is arranged such that when the fourth surface 419b of the rotor carrying device 432 comes in contact with the second surface 418b of the housing 416 after axial movement of the rotor carrying device 432, further relative movement along the rotation axis R between the rotor carrying device 432 and the housing 416 is stopped by the contact between the fourth surface 419b and the second surface 418b. If the movement of the rotor carrying device 432 continues in the same direction, the housing 416 is pushed along the rotation axis R by the contact between the fourth surface 419b and the second surface 418b and the housing 416 being slidably arranged on the machine.

The rotor 412 should be arranged in the housing 416 such that rotation of the rotor 412 in relation to the stator 414 about the rotation axis R is allowed. For example, as illustrated in FIGS. 3a and 3b, the rotor 412 is arranged in a cavity 450 of the housing 416 such that rotation of the rotor 412 in relation to the stator 414 about the rotation axis R is allowed.

It is to be noted that the particular arrangement illustrated in FIGS. 3a and 3b is merely exemplary and that other configurations are possible. For example, FIGS. 3a and 3b illustrate particular arrangements of a stator and a rotor in relation to a housing and a stub shaft. Alternative arrangements are possible that obtain the relative movements and rotations of the stator, the rotor, and the housing. For example, the rotor and the stator may be arranged otherwise than directly on the stub shaft and the housing, respectively. For example, they may be arranged on other parts which in turn are arranged on the stub shaft and the housing, respectively. Furthermore, the first surface, second surface, third surface, and fourth surface may be otherwise arranged than on the bushing and the housing, respectively. For example, they may be arranged on other parts which in turn are arranged on the stub shaft and the housing, respectively.

The example embodiments illustrated in FIGS. 1a, 1b, 3a and 3b relate to axially sensing rotary encoders 10, 400. In axially sensing rotary encoders, sensing by a stator 14, 414 of rotation of a rotor 12, 412 is made in an axial direction, i.e., along a direction of a rotary axis R of a shaft 32 on which the rotor 14, 414 is arranged.

Figure 4A:
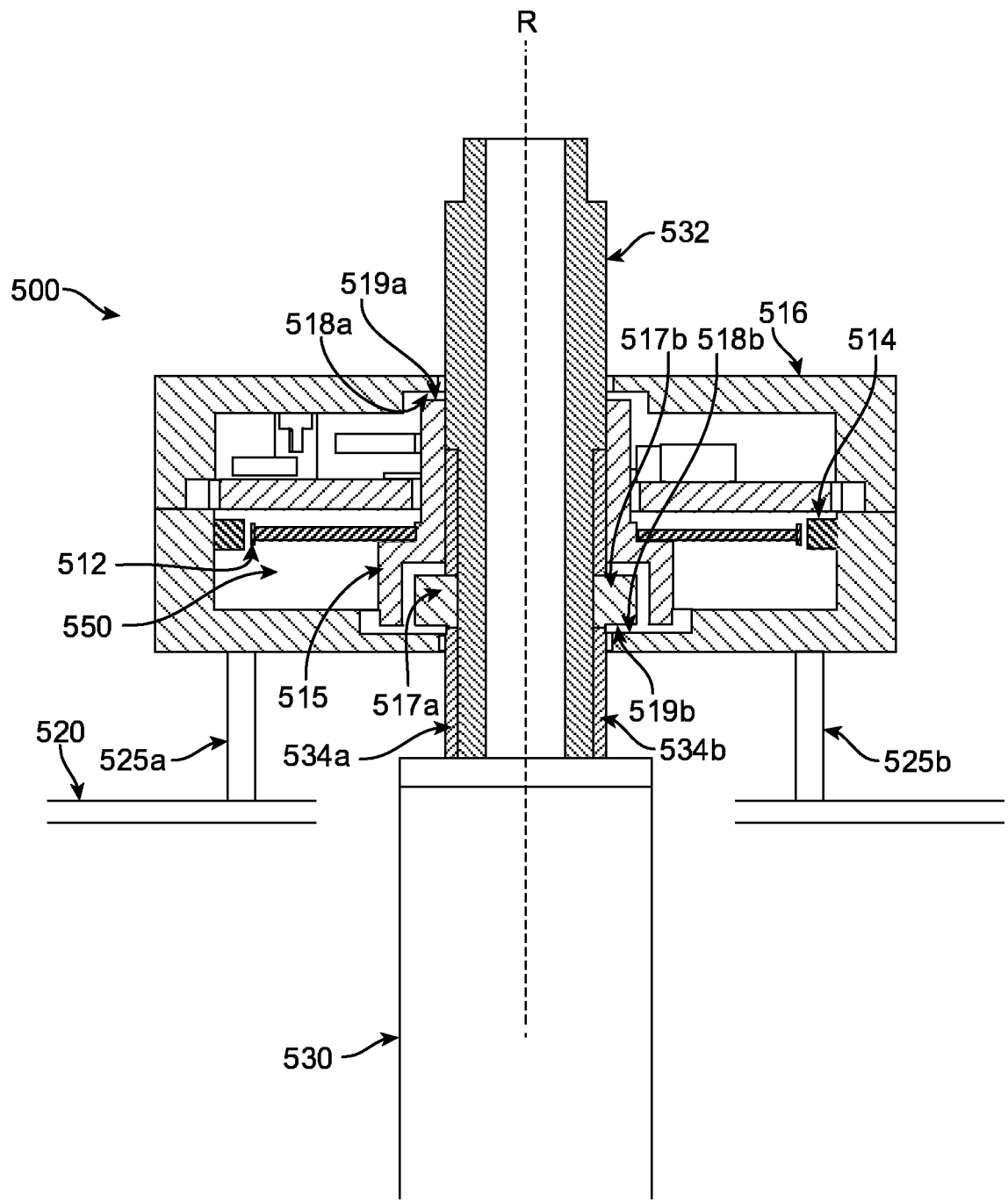
FIG. 4a is a cross-sectional view of rotary encoder according to a further example embodiment of the present invention as arranged on a machine including a shaft.

FIG. 4a is a cross-sectional view of a rotary encoder 500 according to an example embodiment of the present invention as arranged on a machine 520 that includes a shaft 530. The rotary encoder 500 illustrated in FIG. 4a differs from the rotary encoder 10 illustrated in FIGS. 1a and 1b in that it is a radially sensing encoder. In radially sensing rotary encoders, sensing by a stator of rotation of a rotor is made in a radial direction of a rotary axis of a shaft on which the rotor is arranged. The encoder 500 illustrated in FIG. 4a includes a rotor 512 and a stator 514. The rotor 512 is arranged on a rotor carrying device in the form of a bushing 515 and the stator 514 is arranged on a stator carrying device in the form of a housing 516. The rotation of the rotor 512 with respect to the stator may be detected using any technology capable of detecting such changes. Examples of such technologies include, for example, capacitive, optical, inductive, and magnetic detection. The rotary encoder may be configured as an incremental and/or an absolute rotary encoder. The terms rotor and stator may refer to single components as well as aggregates serving a common function of rotor or stator.

The bushing 515 is arranged inside the housing 516. Furthermore, the bushing 515 is arranged on a stub shaft 532, which, in turn, is arranged on the machine shaft 530 of the machine 520. The stub shaft 532 is arranged on the machine shaft 530 by suitable fastening devices, such that they have a common rotation axis R and such that relative movement along the rotation axis R and relative rotation around the rotation axis R between the stub shaft 532 and machine shaft 530 is prevented.

The housing 516 is arranged on the machine 520 by fastening devices 525a and 525b such that rotation of the housing 516 in relation to the machine around the rotation axis R is prevented.

The bushing 515 includes first engagement devices 517a and 517b in the form of spring loaded protrusions. The stub shaft 532 includes corresponding engagement devices 534a and 534b in the form of recesses extending along the outer surface of the stub shaft 532 in a direction of the rotation axis R. The bushing 515 is arranged on the stub shaft 532 such that the first engagement devices 517a and 517b engage with the second engagement devices 534a and 534b, respectively, such that a movement of the bushing 515 in relation to the stub shaft 532 along the rotation axis R is allowed whereas rotation of the bushing 515 in relation to the stub shaft 532 around the rotation axis R is prevented. For example, the protrusions may be spherical at least in the portion arranged to engage with the recesses and the recesses may have a v-shaped cross-section along the rotation axis R.

The housing 516 has a first surface 518a perpendicular to the rotation axis R and a second surface 518b perpendicular to the rotation axis R. The bushing 515 has a third surface 519a perpendicular to the rotation axis R and a fourth surface 519b perpendicular to the rotation axis R. The first surface 518a of the housing 516 faces the third surface 519a of the bushing 515, and second surface 518b of the housing 516 faces the fourth surface 519b of the bushing 515. Furthermore, the housing 516 and the bushing 515 are so arranged that the distance from the first surface 518a to the second surface 518b is greater than the distance from the third surface 519a to the fourth surface 519b. Hence, the bushing 515 can move along the rotation axis R from a first position in relation to the housing 516 where the first surface 518a and the third surface 519a are in contact to a second position in relation to the housing 516 where the second surface 518b is in contact with the fourth surface 519b. The difference between the distance from the first surface 518a to the second surface 518b and the distance from the third surface 519a to the fourth surface 519b, i.e., from the first position to the second position, is selected to a predetermined distance. This will, in turn, restrict the relative movement of the rotor 512 arranged on the bushing 515 and the stator 514 arranged on the housing 16 within the predetermined distance. The predetermined distance is selected to be less or equal to a maximum variation of relative distance between the rotor 512 and the stator 514 allowed to produce signals of an accuracy required for an intended application of the rotary encoder 510.

The rotor 512 is arranged in a cavity 550 of the housing 516 such that rotation of the rotor 512 in relation to the stator 514 about the rotation axis R is allowed.

Figure 4B:
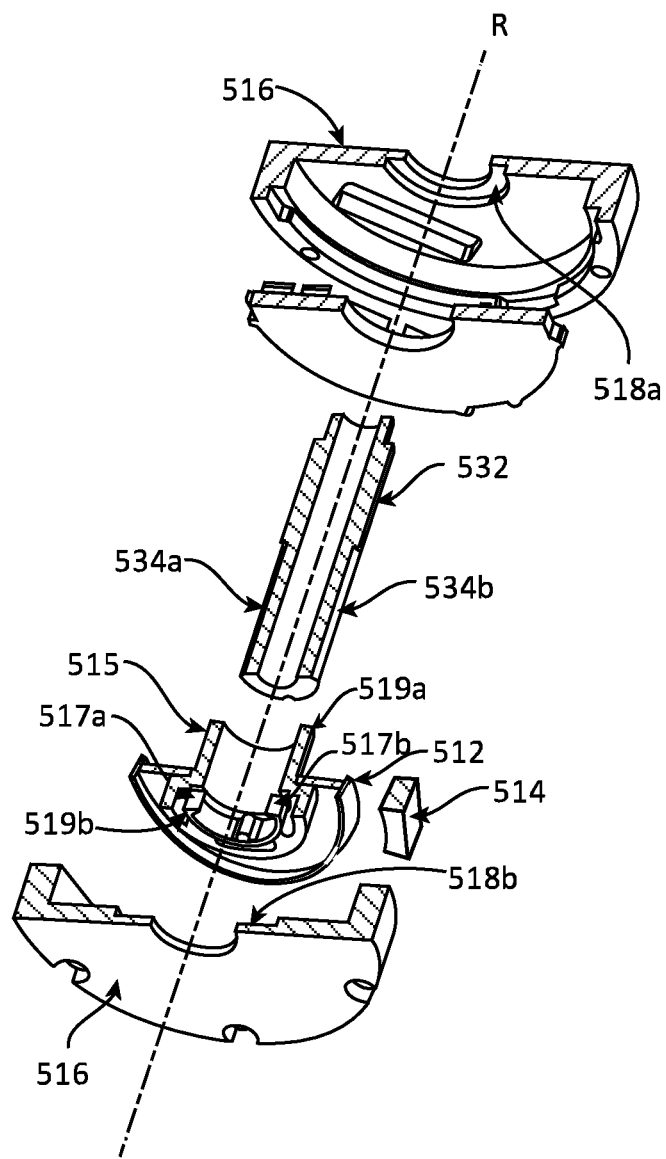

FIG. 4b is an exploded perspective cross-sectional view of the rotary encoder 500. An upper part of the housing 516 has a hole in the center through which the stub shaft 532 may protrude when the rotary encoder 500 is arranged on the machine that includes the shaft on which the stub shaft 532 is arranged. The upper portion of the housing 516 includes the first surface 518a.

The rotor 512 is arranged on the bushing 515 and the bushing 515 has a hole for arranging the bushing 515 on the stub shaft 532. The first engagement devices 517a and 517b in the form of two spring loaded protrusions are arranged so that the spring loaded protrusions protrude into the hole of the bushing 515 such that they engage with the second engagement devices 534a and 534b in the form of corresponding two recesses in the stub shaft 532 when the bushing 515 is arranged on the stub shaft 532. The second engagement devices 534a and 534b in the form of the two recesses extend along the rotation axis R of the stub shaft 532 such that when the bushing 515 is arranged on the stub shaft 532, the bushing 515 is allowed to move in relation to the stub shaft 532 along the rotation axis R of the stub shaft 532 but the bushing 515 is prevented to rotate in relation to the stub shaft 532 around the rotation axis R of the stub shaft 532.

The stator 514 is arranged in the lower portion of the housing 516. The lower portion of the housing 516 further includes the second surface 518b.

Furthermore, as illustrated in FIG. 4b, the first surface 518a and the second surface 518b of the housing 516 are arranged to in relation to the third surface 519a and the fourth surface 519b of the bushing 515, such that the distance from the first surface 518a to the second surface 518b is greater than the distance from the third surface 519a to the fourth surface 519b. Hence, the bushing 515 can move along the rotation axis R from a first position in relation to the housing 516 where the first surface 518a and the third surface 19a are in contact to a second position in relation to the housing 516 where the second surface 518b is in contact with the fourth surface 519b. The difference between the distance from the first surface 518a to the second surface 518b and the distance from the third surface 519a to the fourth surface 519b, i.e., from the first position to the second position, is selected to a predetermined distance. This will, in turn, restrict the relative movement of the rotor 512 arranged on the bushing 515 and the stator 514 arranged on the housing 516 within the predetermined distance. The predetermined distance is selected to be less or equal to a maximum variation of relative distance between the rotor 512 and the stator 514 allowed to produce signals of an accuracy required for an intended application of the rotary encoder 500.

The alternative arrangements of the first surface 18a, 118a, 218a, 318a and the second surface 18b, 118b, 218b, 318b of the housing 16, 116, 216, 316, and the third surface 19a, 119a, 219a, 319a and the fourth surface 19b, 119b, 219b, 319b of the bushing 15, 115, 215, 315 illustrated in FIGS. 2a to 2d are applicable also for the first surface 518a and the second surface 518b of the housing 516, and the third surface 519a and the fourth surface 519b of the bushing 515 of the arrangement illustrated in FIGS. 4a and 4b. The surfaces are arranged such that movement of the rotor 512 arranged on the bushing 515 in relation to the stator 514 arranged on the housing 516 is restricted to a predetermined distance. The predetermined distance is selected to be less or equal to the maximum variation of relative distance between the rotor 512 and the stator 514 allowed to produce signals of an accuracy required for an intended application.

While some of the Figures have been limited to illustrate only certain aspects of the rotary encoder, it should be understood that technical features disclosed in relation to a certain example embodiment or aspect may be applied to any other example embodiment or aspect, unless explicitly stated that such a combination is impossible. In other words, the features illustrated in relation to the Figures may be combined freely, unless stated otherwise.

The description of the example embodiments provided herein are presented for purposes of illustration. The description is not intended to be exhaustive or to limiting, and modifications and variations are possible in light of the above description or may be acquired from practice of various alternatives to the illustrated example embodiments. The examples discussed herein were chosen and described in order to explain the principles and the nature of example embodiments and its practical application to allow for utilization of the example embodiments in various manners and with various modifications as are suited to the particular use contemplated. The features of the example embodiments described herein may be combined in all possible combinations of apparatus, modules, and systems. It should be appreciated that the example embodiments presented herein may be practiced in any combination with each other. Furthermore, many variations and modifications can be made to these example embodiments.

It should be noted that the singular "a" or "an" preceding a component does not exclude the presence of a plurality of such components. Furthermore, although specific terms are employed, they are used in a generic and descriptive sense only and not for purposes of limitation.

What is claimed is:

1. A rotary encoder attachable to a machine that includes a shaft that is rotatable about a rotation axis, comprising:
    a stator;
    a rotor adapted to be attached to the shaft of the machine;
    a rotor carrying device and a stator carrying device, the rotor being fixed to the rotor carrying device, the stator being fixed to the stator carrying device; and
    wherein the rotor is rotatable relative to the stator about the rotation axis of the shaft, relative movement between the rotor and the stator along the rotation axis of the shaft being restricted to a predetermined distance in an assembled state of the rotary encoder to the machine, the rotor being movable relative to the shaft along the rotation axis of the shaft in the assembled state of the rotary encoder to the machine;
    wherein the rotor carrying device and the stator carrying device are arranged such that, when the rotor carrying device is arranged on the shaft and the stator carrying device is arranged on the machine that includes the shaft, the rotor carrying device is rotatable relative to the stator carrying device about the rotation axis of the shaft, and relative movement between the rotor carrying device and the stator carrying device along the rotation axis of the shaft is limited to the predetermined distance;
    wherein the rotor carrying device is arranged such that, when arranged on the shaft, the rotor carrying device is movable relative to the shaft along the rotation axis of the shaft; and
    wherein the stator carrying device is adapted to be arranged on the shaft and includes a first surface and a second surface, and the rotor carrying device is adapted to be arranged on the machine and includes a third surface and a fourth surface, the first surface facing the third surface in a direction along the rotation axis of the shaft, the second surface facing the fourth surface in the direction along the rotation axis of the shaft, an absolute value of a difference between a distance in the direction along the rotation axis of the shaft from the first surface to the second surface and a distance in a direction along the rotation axis of the shaft from the third surface to the fourth surface corresponding to the predetermined distance.

2. The rotary encoder according to claim 1, wherein the distance in the direction along the rotation axis of the shaft from the first surface to the second surface is greater than the distance in the direction along the rotation axis of the shaft from the third surface to the fourth surface.

3. The rotary encoder according to claim 1, wherein the first surface, the second surface, the third surface, and the fourth surface are adapted to be arranged adjacent to the shaft when the rotor carrying device is arranged on the shaft and the stator carrying device is arranged on the machine.

4. The rotary encoder according to claim 1, wherein the rotor carrying device includes a first engagement device adapted to engage with a corresponding second engagement device of the shaft, the first engagement device and the second engagement device adapted to prevent rotation of the rotor carrying device relative to the shaft about the rotation axis of the shaft and to permit movement of the rotor carrying device relative to the shaft along the rotation axis when the rotor carrying device is arranged on the shaft.

5. The rotary encoder according to claim 4, wherein the second engagement device includes recess extending along an outer surface of the shaft in the direction of the rotation axis of the shaft, and the first engagement device includes spring loaded protrusions adapted to engage corresponding recesses of the second engagement device.

6. The rotary encoder according to claim 1, wherein the relative movement between the rotor and the stator along the rotation axis of the shaft is restricted to the predetermined distance in the assembled state of the rotary encoder to the machine and during rotational movement between the rotor and the stator, the rotor being movable relative to the shaft along the rotation axis of the shaft in the assembled state of the rotary encoder to the machine and during rotational movement between the rotor and the stator.

7. The rotary encoder according to claim 1, wherein the relative movement between the rotor and the stator along the rotation axis of the shaft is restricted to the predetermined distance in the assembled state of the rotary encoder to the machine and during a measurement operation of the rotary encoder, the rotor being movable relative to the shaft along the rotation axis of the shaft in the assembled state of the rotary encoder to the machine and during a measurement operation of the rotary encoder.

8. A rotary encoder attachable to a machine that includes a shaft that is rotatable about a rotation axis, comprising:
a stator;
a rotor adapted to be attached to the shaft of the machine; and
a rotor carrying device and a stator carrying device, the rotor being fixed to the rotor carrying device, the stator being fixed to the stator carrying device;
wherein the rotor is rotatable relative to the stator about the rotation axis of the shaft, relative movement between the rotor and the stator along the rotation axis of the shaft being limited to a predetermined distance in an assembled state of the rotary encoder to the machine, the stator being movable relative to the machine along the rotation axis of the shaft in the assembled state of the rotary encoder to the machine;
wherein the rotor carrying device and the stator carrying device are arranged such that, when the rotor carrying device is arranged on the shaft and the stator carrying device is arranged on the machine that includes the shaft, the rotor carrying device is rotatable relative to the stator carrying device about the rotation axis of the shaft, and relative movement between the stator carrying device and the rotor carrying device along the rotation axis of the shaft is limited to the predetermined distance;
wherein the stator carrying device is arranged such that, when arranged on the machine that includes the shaft, the stator carrying device is movable along the rotation axis of the shaft; and
wherein the stator carrying device is adapted to be arranged on the machine and includes a first surface and a second surface, and the rotor carrying device is adapted to be arranged on the shaft and includes a third surface and a fourth surface, the first surface facing the third surface in a direction along the rotation axis of the shaft, the second surface facing the fourth surface in the direction along the rotation axis of the shaft, an absolute value of a difference between a distance in the direction along the rotation axis of the shaft from the first surface to the second surface and a distance in the direction along the rotation axis of the shaft from the third surface to the fourth surface corresponding to the predetermined distance.

9. The rotary encoder according to claim 8, wherein the distance in the direction along the rotation axis of the shaft from the first surface to the second surface is greater than a distance in the direction along the rotation axis of the shaft from the third surface to the fourth surface.

10. The rotary encoder according to claim 8, wherein the stator carrying device includes a first engagement device adapted to engage with a corresponding second engagement device arranged on the machine to prevent rotation of the stator carrying device relative to the machine about the rotation axis of the shaft and to permit movement of the stator carrying device relative to the machine along the rotation axis of the shaft.

11. The rotary encoder according to claim 8, wherein the relative movement between the rotor and the stator along the rotation axis of the shaft is limited to the predetermined distance in the assembled state of the rotary encoder to the machine and during rotational movement between the rotor and the stator, the rotor being movable relative to the shaft along the rotation axis of the shaft in the assembled state of the rotary encoder to the machine and during rotational movement between the rotor and the stator.

12. The rotary encoder according to claim 8, wherein the relative movement between the rotor and the stator along the rotation axis of the shaft is limited to the predetermined distance in the assembled state of the rotary encoder to the machine and during a measurement operation of the rotary encoder, the rotor being movable relative to the shaft along the rotation axis of the shaft in the assembled state of the rotary encoder to the machine and during a measurement operation of the rotary encoder.

* * * * *